UNITED STATES PATENT OFFICE.

WM. HUGHES, OF BLOOMINGTON, ILLINOIS.

IMPROVEMENT IN TEMPERING STEEL SPRINGS.

Specification forming part of Letters Patent No. 49,108, dated August 1, 1865.

*To all whom it may concern:*

Be it known that I, WILLIAM HUGHES, of Bloomington, in the county of McLean and State of Illinois, have invented a new and useful Improvement in Tempering Steel Springs; and I do hereby declare that the following is a full, clear, and exact description thereof, which will enable those skilled in the art to make and use the same.

There are two kinds of steel in common use for making springs. The first and the oldest kind is commonly called "spring-steel," or bars of iron converted into steel. The other kind is cast-steel. It has more elasticity and more strength than the first-named steel, and each kind requires a different treatment in hardening and tempering the springs.

It is well known that cast-steel springs, when heated and plunged in cold water, are liable to crack and become useless, and it is therefore the common practice of those skilled in the art of tempering springs to use oil instead of water. With oil, however, arises another difficulty. It soon heats up to such a degree that the springs do not become sufficiently hard, and the operation of tempering must either be interrupted or a very large quantity of oil must be on hand to change it.

These disadvantages are overcome by this invention, which consists in coating the steel to be tempered, previous to heating, with soap, black lead, plumber's size, potash, soda, or prussiate of potash, and, after heating, dipping it into water or a solution of salt, sal-ammoniac, borax, and copperas in water.

The proportion in which I mix my ingredients for the solution together is about as follows: common salt, one pound; sal-ammoniac, three-quarters of a pound; borax, one-half pound; copperas, one ounce; rain-water, two gallons.

The above-named salts are finely pulverized and stirred in the water until they are dissolved. When the solution is ready, the cast-steel springs to be tempered are coated all over with soap or any of the other articles before enumerated, though soap is used by preference, because it is always on hand. Then I put the springs to be tempered into a red-hot furnace, and let them remain until red-hot, and plunge them into my solution or into water. Then I reduce the hardness of the steel by reheating in the usual way.

By this process cast-steel springs can be hardened without the least danger of cracking.

Springs made of spring-steel are not coated with any of the before-named articles. They are heated red-hot and plunged into the solution before described, and then I reduce the hardness in the usual way.

I claim as new and desire to secure by Letters Patent—

1. The within-described process of hardening cast-steel springs by first coating them with soap or its equivalent before heating, and cooling them off, as before described.

2. The hydrated solution above set forth, and composed of the ingredients herein specified, for the purpose of hardening springs of either cast or spring steel.

WILLIAM HUGHES.

Witnesses:
JOSEPH HUGHES,
G. FERRE.